United States Patent
Bradley et al.

(10) Patent No.: US 9,003,239 B2
(45) Date of Patent: *Apr. 7, 2015

(54) MONITORING AND RESOLVING DEADLOCKS, CONTENTION, RUNAWAY CPU AND OTHER VIRTUAL MACHINE PRODUCTION ISSUES

(71) Applicant: International Business Machines Corporation, Armonk, NY (US)

(72) Inventors: Lisa M. W. Bradley, Cary, NC (US); Kevin Grigorenko, San Diego, CA (US); Rohit D. Kelapure, Durham, NC (US); Dana L. Price, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/886,633

(22) Filed: May 3, 2013

(65) Prior Publication Data

US 2013/0283090 A1 Oct. 24, 2013

Related U.S. Application Data

(63) Continuation of application No. 13/451,937, filed on Apr. 20, 2012.

(51) Int. Cl.
*G06F 11/00* (2006.01)
*G06F 11/07* (2006.01)
*G06F 11/30* (2006.01)

(52) U.S. Cl.
CPC ........ *G06F 11/0793* (2013.01); *G06F 11/0709* (2013.01); *G06F 11/0712* (2013.01);

(Continued)

(58) Field of Classification Search
CPC . G06F 11/00; G06F 11/0751; G06F 11/0754; G06F 11/076; G06F 11/079; G06F 11/0793; G06F 11/30; G06F 11/301; G06F 11/3055; G06F 11/3058
USPC ......... 714/25, 26, 39, 45, 46, 47.1, 47.2, 47.3
See application file for complete search history.

(56) References Cited

U.S. PATENT DOCUMENTS

2004/0194066 A1   9/2004   Frey et al.
2005/0065753 A1*  3/2005   Bigus et al. .................. 702/186

(Continued)

OTHER PUBLICATIONS

Oracle, Enhancements in JDK 6: Java Virtual Machine Tool Interface (JVM TI), 2011, Oracle, retrieved Apr. 17, 2012, <http://docs.oracle.com/javase/6/docs/technotes/guides/jvmti/changes6.html>.

(Continued)

*Primary Examiner* — Joseph D Manoskey
(74) *Attorney, Agent, or Firm* — Patterson & Sheridan, LLP

(57) ABSTRACT

Resolving virtual machine (VM) issues, by executing VM and operating system (OS) diagnostic monitors, including, monitoring a set of VM and OS health status metrics of a system at a first level, analyzing data of the monitored health status metrics to determine that an instability has occurred when the data exceeds defined bounds for the health status metrics, responding to the instability by monitoring additional VM and OS health status metrics, whereby a level of monitoring of the system is increased from the first level to a second level, greater than the first level, identifying the instability, repairing the system by taking corrective action based on the identified instability; and removing at least one of the set of monitoring and profiling tools to reduce the level of monitoring to a third level once the instability has been resolved, wherein the third level is less than the second level.

8 Claims, 7 Drawing Sheets

(52) U.S. Cl.
CPC ......... *G06F11/3006* (2013.01); *G06F 11/301* (2013.01); *G06F 11/3089* (2013.01); *G06F 11/076* (2013.01)

(56) References Cited

U.S. PATENT DOCUMENTS

| | | | |
|---|---|---|---|
| 2005/0261879 A1 | 11/2005 | Shrivastava et al. | |
| 2008/0274716 A1 | 11/2008 | Fok et al. | |
| 2010/0131636 A1 | 5/2010 | Suri et al. | |
| 2011/0055388 A1* | 3/2011 | Yumerefendi et al. | 709/224 |
| 2011/0138366 A1 | 6/2011 | Wintergerst et al. | |
| 2011/0173496 A1* | 7/2011 | Hosek et al. | 714/26 |
| 2013/0013953 A1* | 1/2013 | Eck et al. | 714/2 |
| 2013/0073911 A1* | 3/2013 | Terris et al. | 714/47.1 |

OTHER PUBLICATIONS

IBM, IBM WebSphere Application Server Utilities Hung Thread Interrupter, IBM: developerWorks, Jan. 27, 2011, retrieved Apr. 17, 2012, IBM, <http://www.ibm.com/developerworks/websphere/downloads/hungthread.html>.

IBM, IBM Research: Jinsight, retrieved Apr. 18, 2012, <http://www.research.ibm.com/jinsight/>.

IBM, Jinsight, Java Diagnostics Guide 1.4.2, retrieved Apr. 18, 2012, <http://publib.boulder.ibm.com/infocenter/javasdk/v1r4m2/index.jsp?topic=%2Fcom.ibm.java.doc.diagnostics.142%2Fhtml%2Fjinsight.html>.

IBM, IBM developer kits, retrieved Apr. 18, 2012, <http://www.ibm.com/developerworks/java/jdk/tools/index.html>.

java.net, VisualWM, retrieved Apr. 18, 2012, <http://visualvm.java.net/>.

IBM, Tivoli Monitoring—Tivoli Composite Application Manager, retrieved Apr. 18, 2012, <http://www-01.ibm.com/software/tivoli/products/composite-application-mgrproductline/>.

Bacon, David F. et al., Tin Locks: Featherweight Synchronization for Java, Oct. 11, 1998, IBM, Armonk, New York, United States.

U.S. Appl. No. 13/451,937, entitled Monitoring and Resolving Deadlocks, Contention, Runaway CPU and Other Virtual Machine Production Issues, filed Apr. 20, 2012.

* cited by examiner

MONITORING AND RESOLVING DEADLOCKS, CONTENTION, RUNAWAY CPU AND OTHER VIRTUAL MACHINE PRODUCTION ISSUES

CROSS-REFERENCE TO RELATED APPLICATIONS

This application is a continuation of co-pending U.S. patent application Ser. No. 13/451,937, filed Apr. 20, 2012. The aforementioned related patent application is herein incorporated by reference in its entirety.

BACKGROUND

Embodiments described herein generally relate to the field of computer software. In particular, embodiments of the invention relate to monitoring, detecting, and resolving virtual machine production issues.

SUMMARY

Embodiments described herein provide a computer-implemented method, a computer program product, and a system for resolving virtual machine (VM) issues by executing virtual machine (VM) and operating system (OS) diagnostic monitors, including, monitoring a set of VM and OS health status metrics of a system at a first level, analyzing data of the monitored health status metrics to determine that an instability has occurred when the data exceeds defined bounds for the health status metrics, responding to the instability by monitoring additional VM and OS health status metrics, whereby a level of monitoring of the system is increased from the first level to a second level, greater than the first level, identifying the instability, repairing the system by taking corrective action based on the identified instability; and removing at least one of the set of monitoring and profiling tools to reduce the level of monitoring to a third level once the instability has been resolved, wherein the third level is less than the second level.

BRIEF DESCRIPTION OF THE DRAWINGS

So that the manner in which the above recited aspects are attained and can be understood in detail, a more particular description of embodiments, briefly summarized above, may be had by reference to the appended drawings.

It is to be noted, however, that the appended drawings illustrate only typical embodiments and are therefore not to be considered limiting of its scope, for the invention may admit to other equally effective embodiments.

DETAILED DESCRIPTION

Figure 1:
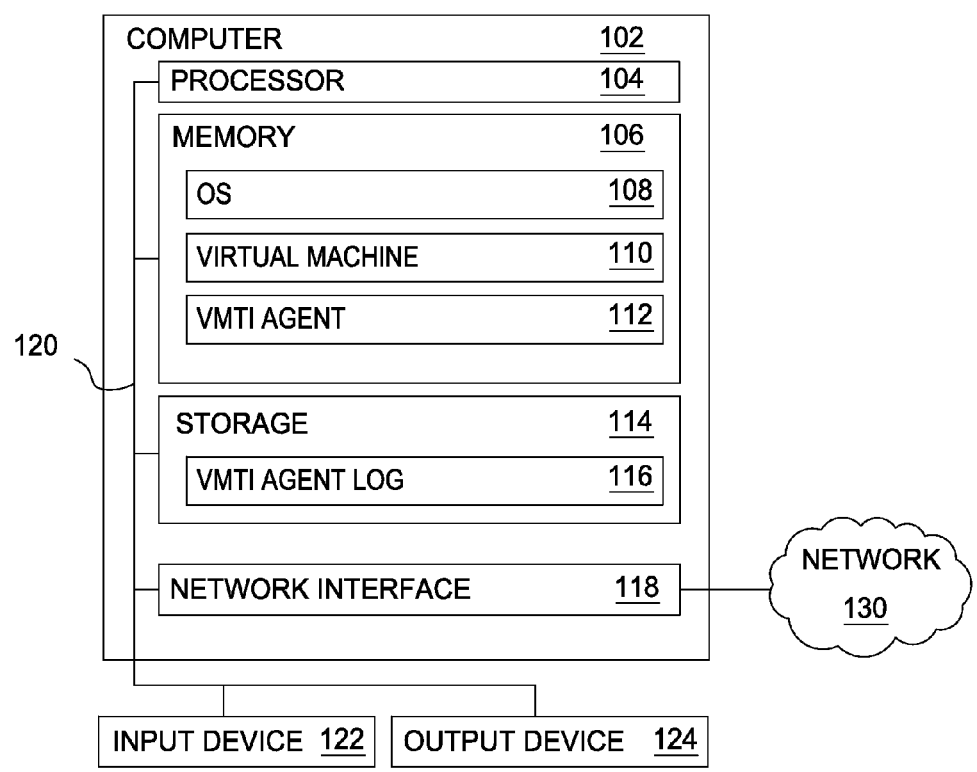
FIG. 1 is a block diagram illustrating one embodiment of a computer system running a virtual machine.

Currently, computer software applications may be deployed on servers or client computers. Some applications may be executed within an environment provided by a virtual machine (VM). A virtual machine provides an abstract specification for a computing device that may be implemented in different ways. The virtual machine allows a computer program or application to run on any computer platform, regardless of the underlying hardware. Applications compiled for the virtual machine may be executed on any underlying computer system, provided that a version of the virtual machine is available. Typically, the virtual machine is implemented in software rather than hardware and is often referred to as a "runtime environment." In general, the virtual machine executes an application by generating instructions from the source code that may then be performed by a physical processor available on the underlying computer system.

One well known example of a virtual machine is the Java virtual machine, available from Oracle Corporation. (Java and all Java-based trademarks and logos are trademarks or registered trademarks of Oracle and/or its affiliates.) The Java virtual machine (JVM) consists of a bytecode instruction set, a set of registers, a stack, a garbage-collected heap (i.e., memory space for user applications), and a memory space for storing methods. Source code compiled for a Java virtual machine is typically referred to as "bytecode." Applications written in the Java programming language may be compiled to generate bytecodes. The bytecodes provide the platform-independent code interpreted by the Java virtual machine.

A virtual machine, like any computing environment, inevitably will suffer from performance health issues. Current approaches for detecting and resolving VM health issues like deadlocks, hangs, and high processor utilization are very intrusive. These approaches involve instrumentation and profiling of code, transformation of class files, and heap walking, which make use of a VM tool interface (VMTI). The improved VMTI agent disclosed herein provides a way to inspect the state of the system and virtual machine and to control the execution of applications running in the VM.

Much of the raw data comprising health status metrics comes either from the OS or the VM. Current tools for profiling, debugging, monitoring, and thread analysis do not take all of this information into account when repairing the VM. Profiling is a form of dynamic program analysis which investigates a program's behavior as it executes. A profiler may, for example, monitor processor (CPU) and memory usage during program execution, and the results are used to identify code portions of the program which may be optimized due to poor runtime performance. The current tools also fail to combine the OS and VM health metrics to provide a unified solution considering the entire state of the system. The lack of a unified solution is exacerbated when multiple VMs are deployed on the same system in the cloud, where a solution addressing the system as a whole would be more advantageous than a piece by piece solution (i.e., VM to VM), which may produce conflicting results.

Embodiments described herein provide a VMTI agent configured to enable VM and OS diagnostics in a holistic manner to repair a VM from a critical state by dynamically adding or removing monitoring and profiling points at runtime. The VMTI agent thus only adds monitoring and profiling points when necessary, i.e., in response to a detected instability, and removes them once the instability has been resolved. For example, the VMTI agent can add tools which monitor CPU and memory utilization, and remove the tools when the system state returns to normal. The VMTI agent monitors the underpinnings of VM and OS activities, such as processor and memory utilization, and takes corrective action based on these monitored health status metrics. The dynamic nature of the VMTI agent allows the agent to take itself in and out of the system as needed with the goal of keeping profiler costs at a minimum.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications such as the VMTI agent or related data available in the cloud. For example, the VMTI agent could execute on a computing system in the cloud and monitor and repair critical system errors. In such a case, the VMTI agent could monitor and correct critical system errors and store VMTI agent log data at a storage location in the cloud. Doing so allows a user to access this information from any computing system attached to a network connected to the cloud (e.g., the Internet).

It is understood in advance that although this disclosure includes a detailed description on cloud computing, implementation of the teachings recited herein are not limited to a cloud computing environment. Rather, embodiments described herein are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 1 is a block diagram illustrating a system 100 for monitoring and repairing virtual machine production issues, according to one embodiment of the invention. The networked system 100 includes a computer 102. The computer 102 may also be connected to other computers via a network 130. In general, the network 130 may be a telecommunications network and/or a wide area network (WAN). In a particular embodiment, the network 130 is the Internet.

The computer 102 generally includes a processor 104 connected via a bus 120 to a memory 106, a network interface device 118, a storage 114, an input device 122, and an output device 124. The computer 102 is generally under the control of an operating system. Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 118 may be any type of network communications device allowing the computer 102 to communicate with other computers via the network 130.

The storage 114 may be a persistent storage device. Although the storage 114 is shown as a single unit, the storage 114 may be a combination of fixed and/or removable storage devices, such as fixed disc drives, solid state drives, floppy disc drives, tape drives, removable memory cards or optical storage. The memory 106 and the storage 114 may be part of one virtual address space spanning multiple primary and secondary storage devices. As shown, storage 114 contains a VMTI agent log 116, in which the VMTI agent stores event data, described in further detail below.

The input device 122 may be any device for providing input to the computer 102. For example, a keyboard and/or a mouse may be used. The output device 124 may be any device for providing output to a user of the computer 102. For example, the output device 124 may be any conventional display screen or set of speakers. Although shown separately from the input device 122, the output device 124 and input device 122 may be combined. For example, a display screen with an integrated touch-screen may be used.

In one embodiment, one or more virtual machine(s) 110 may reside within memory 106. Each virtual machine 110 running on computer system 100 is configured to execute software applications created for the virtual machine 110. For example, the virtual machine 110 may comprise the Java virtual machine and operating environment created according to the Java virtual machine specifications. Although embodiments described herein may reference the Java virtual machine as an example, embodiments may be implemented in any virtual machine environment. Finally, memory 106 also contains VMTI agent 112. Generally, VMTI agent 112 watches for excessive monitor contention, and when it determines that some monitors are being used proportionally more than others, it starts to "watch" those monitors more closely to identify a problem. A monitor controls access to an object intended to be used by more than one thread. At any given point in time, at most one thread may have access to a monitor and the object the monitor controls. By operating in this manner, the initial overhead of VMTI agent 112 is kept to a minimum, and VMTI agent 112 increases its overhead only if there is a system or VM instability. For example, the VMTI agent 112 may monitor the heap only when the heap utilization level crosses a specified threshold. The metrics monitored by the VMTI agent 112 should be understood to include any possible health status metric associated with a VM and operating system.

Figure 2:
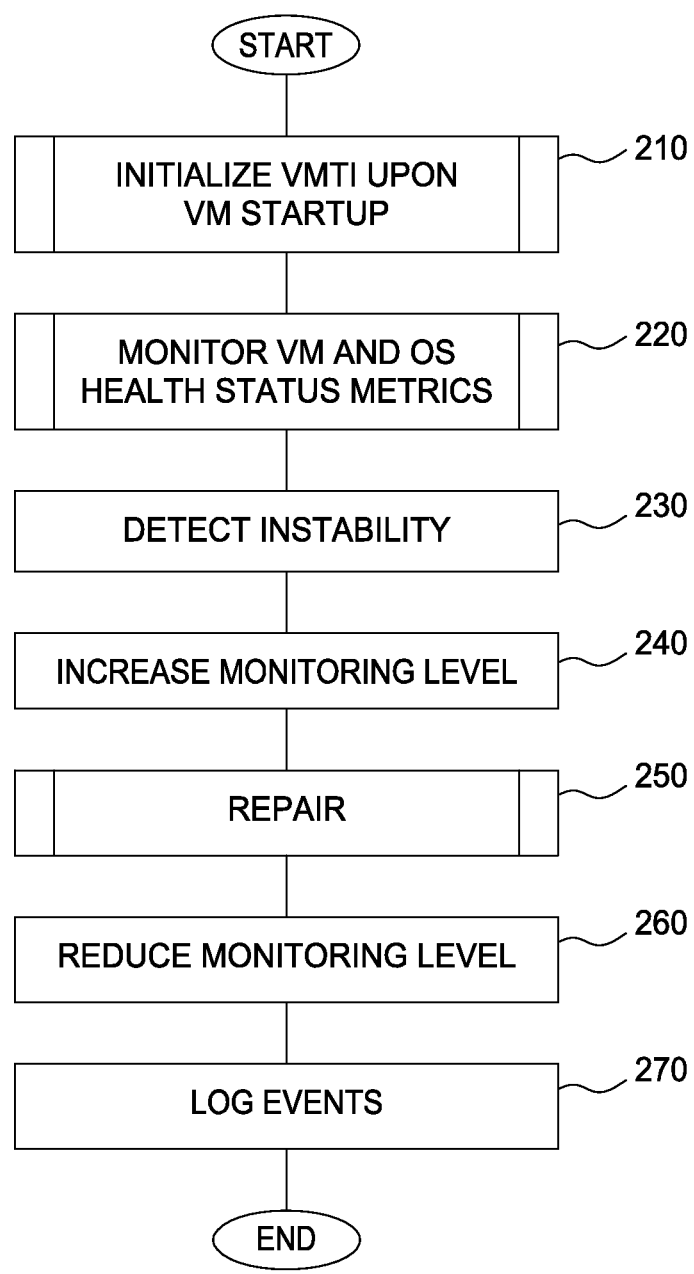
FIG. 2 is a flowchart illustrating a method for monitoring and resolving virtual machine production issues, according to one embodiment described herein.

FIG. 2 is a flowchart illustrating a method 200 for monitoring, detecting, and repairing virtual machine production issues, according to one embodiment. The method begins at step 210, described in greater detail with reference to FIG. 3 below, where the VMTI agent 112 is initialized upon startup of the virtual machine. At step 220, described in greater detail with reference to FIG. 4 below, the VMTI agent 112 begins monitoring VM and OS health status metrics. The metrics monitored may be specified by a user, or may be system default metrics. The metrics may also be based on monitoring patterns under similar conditions as specified in VMTI agent log 116. At step 230, the VMTI agent 112 detects an instability, whereupon at step 240, the VMTI agent 112 increases its monitoring level. An instability may be associated with any hardware or software component of the computer, or any element of the VM or OS. In one embodiment, VMTI agent 112 detects an instability when a metric being monitored exceeds a specified threshold. An increase in the monitoring level is achieved by adding new monitors or profiling points in response to the particular instability detected. In some embodiments, the VMTI agent 112 selects the additional monitors and profiling points based on patterns found to be successful under similar circumstances as specified in the VMTI agent log 116. By increasing the monitoring level, the VMTI agent 112 is more likely to detect the cause of the instability, and thus find a proper solution. The method proceeds to step 250, where the VMTI agent 112 repairs the system. In some embodiments, the VMTI agent 112 selects methods for repair based on patterns determined to be successful under similar circumstances in the VMTI agent log 116. In other embodiments, standard repair methods are implemented which correspond to the detected instability. At step 260, the VMTI agent 112 reduces its monitoring level. At step 270, the VMTI agent 112 writes log data to the VMTI agent log 116.

Embodiments of VMTI agent log 116 may include, but are not limited to, data related to the initial set of health status metrics monitored, detected instabilities, additional health status metric monitors added in response to the instability, corrective actions taken, whether the corrective actions were successful, and health status metrics no longer monitored upon correction of the instability. More generally, the VMTI agent log 116 may include any information related to performance of the VMTI agent 112.

Figure 3:
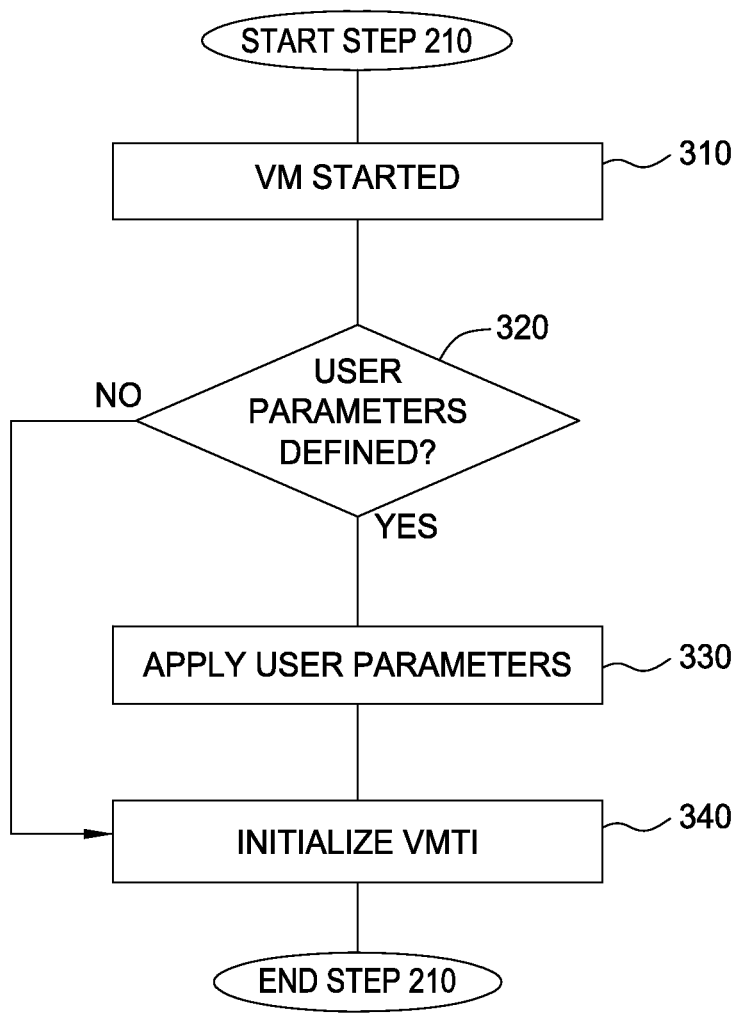
FIG. 3 is a flowchart illustrating initialization of an exemplary virtual machine tool interface agent, according to one embodiment described herein.

FIG. 3 is a flowchart illustrating a method 300 corresponding to step 210 for initializing the VMTI agent 112, according to one embodiment. The method begins at 310, where a VM is started. At step 320, the method determines whether a user has defined custom parameters for the VMTI agent 112. Exemplary parameters include, but are not limited to, maximum CPU utilization, maximum memory utilization, response time overhead, number of previous recommendations made, quality assessment of the user, and the type of monitoring to be implemented. If no user parameters have been defined, the VMTI agent 112 may be configured to supply default parameters, and the method proceeds to step 340. If the user has defined parameters, the method proceeds to step 330, where the user defined parameters are passed as variables to the VMTI agent 112, and the method proceeds to step 340. At step 340, the VMTI agent 112 is initialized, and the VMTI agent 112 uses the supplied parameters to begin monitoring the parameterized set of health status metrics. Once initialized, the VMTI agent 112 monitors the health status metrics specified by the parameters.

Figure 4:
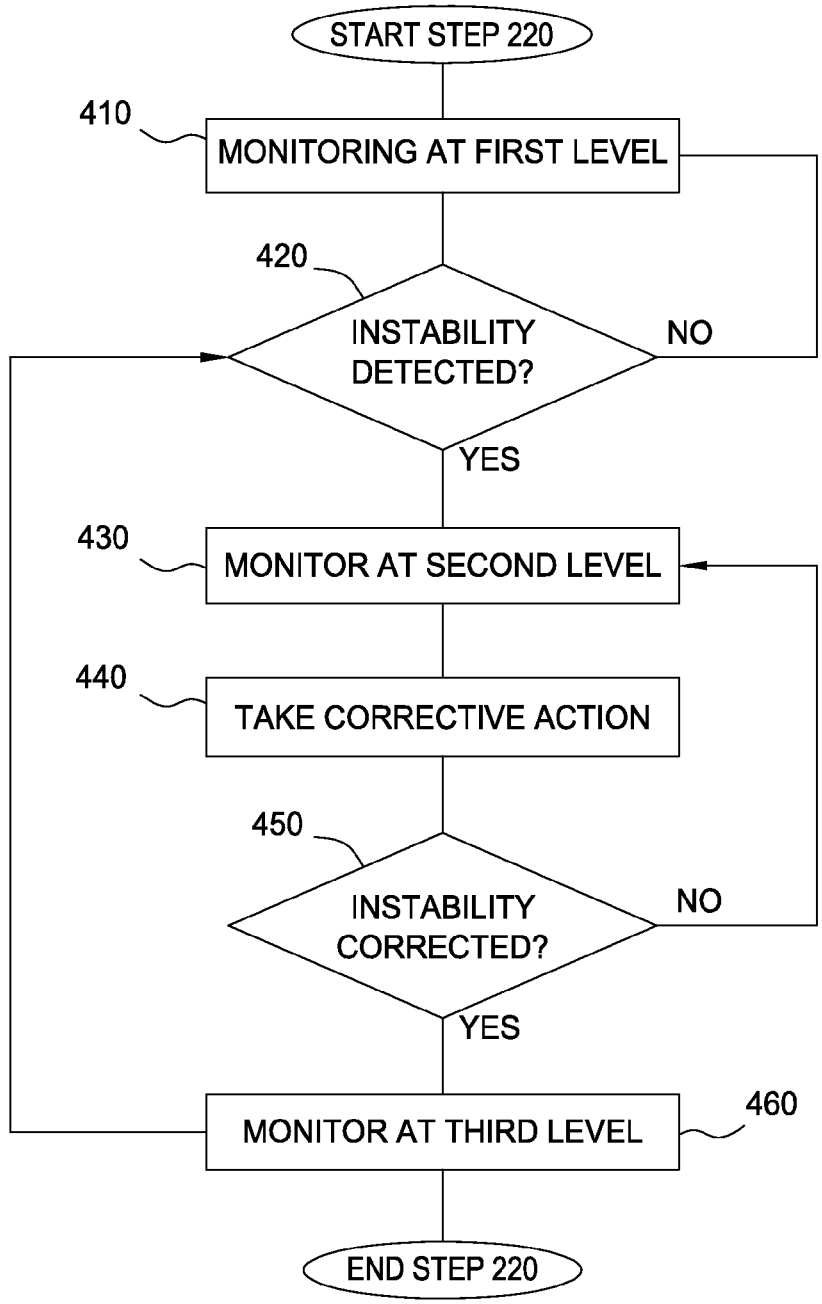
FIG. 4 is a flowchart illustrating a method for monitoring and repairing virtual machine and operating system health status metrics.

FIG. 4 is a flowchart illustrating a method 400 corresponding to step 220 for monitoring VM and OS health status metrics. The method begins at step 410, where the VMTI agent 112 monitors VM and OS health status metrics at a first level. In one embodiment, the first level includes default health status metrics to be monitored, examples of which include, but are not limited to CPU utilization, memory utilization, system network activity, and system input/output interface utilization. In another embodiment, the first level includes health status metrics defined by the system user. In yet another embodiment, the first level includes health status metrics ascertained by the VMTI agent 112 through the use of machine learning, where the VMTI agent 112 intelligently determines which health status metrics to monitor based on past system health as indicated in the VMTI agent log 116. In still another embodiment, the VMTI agent 112 may monitor no health status metrics during times of system standby. Disabling all health status metrics during periods of system standby is premised on the assumption that a system in a standby state will not be subject to runtime issues.

The method then proceeds to step 420, where the VMTI agent 112 detects that an instability has occurred. For instance, an instability has occurred when health status metrics exceed the bounds defined by the VMTI agent 112 or the user. In another embodiment, the VMTI provides support for forced early return from a method to try to limit the damage to the rest of the system and notifies the VM when a critical resource, such as the VM platform heap, has been exhausted. The VMTI agent 112 can utilize this information to determine that an instability has occurred. The method then proceeds to step 430, where the VMTI agent 112 monitors VM and OS health status metrics at a second level, where the VMTI agent 112 dynamically enables monitoring of additional health status metrics not included at the first monitoring level. In one embodiment, the health status metrics monitored at the second level are executed based on the nature of the system instability. For example, if memory utilization is high, the VMTI agent 112 may monitor health status metrics related to the system memory. In another embodiment, the VMTI agent 112 leverages machine learning to determine what health status metrics to monitor based on similar instabilities recorded in the VMTI agent log 116. The VMTI agent 112 may identify patterns of previous system behavior stored in VMTI agent log 116 to determine which health status metrics to monitor. For example, if the VMTI agent 112 identifies a pattern of high CPU utilization in VMTI agent log 116 similar to the current instability, the VMTI agent 112 may identify the CPU metrics monitored in VMTI agent log 116 and apply them to address the current instability. In yet another embodiment, the VMTI agent 112 monitors user defined health status metrics in response to the particular instability.

The method proceeds to step 440, described in further detail below, where the VMTI agent 112 takes corrective action in an attempt to repair the system and return it to a healthy state. In some embodiments, the corrective action taken is directly related to the identified instability. In other embodiments, the corrective action may be determined by detecting a successful pattern in VMTI agent log 116. The method then proceeds to step 450, where the VMTI agent 112 determines whether the instability has been corrected. If the instability has been corrected, the method proceeds to step 460. If the instability has not been corrected, the method returns to step 430, where the VMTI agent 112 continues to monitor at the second level, according to one embodiment. In another embodiment, the VMTI agent 112 may dynamically monitor additional health status metrics. At step 460, the VMTI agent 112 dynamically removes monitoring tools to return to a third level of monitoring. In some embodiments, the third monitoring level may be greater than, less than, or equal to the first and second monitoring levels. The VMTI agent 112 continues monitoring at this third level until an instability is detected and the method returns to step 420. In one embodiment, the third level comprises the VMTI agent 112 removing itself from the system, such that it does not monitor any health status metrics during periods of system health or system standby.

For example, at step 410, the VMTI agent 112 detects that a network connection has not responded for a long period of time. At step 420, the VMTI agent 112 detects this issue using nonintrusive background timers. At step 430, the VMTI agent 112 increases monitoring on that particular network connection by seeing if there are any bytes coming in or going out of that connection. At step 440, the VMTI agent 112 may then decide to terminate that connection and force an early return. If these actions are not successful, at step 460, the VMTI agent may add additional instrumentation to any new connections established to the same destination to log the initial data sent to the destination. If the issue continues, the VMTI agent 112 may again take corrective action at step 440, but at that point the VMTI agent 112 will have additional data logged about why the connection continuously takes too long.

In some embodiments, the different monitoring levels are defined by the output of a function in the VMTI agent 112. In one embodiment, the function accepts user defined parameters, as in step 330 of method 300. In another embodiment, system default parameters are supplied. In one embodiment, the output of the function is an actual set of native functions, which have been parameterized and set as the monitors. In another embodiment, the output is a set of pseudo-instructions sent to a processor which then applies them to the VMTI agent 112. The output of the function will allow the VMTI agent 112 to compare overhead and decide the relative value of each health status metric in an effort to minimize profiling costs. For example, the user specifies what type of monitoring they prefer the most (such as operating system monitoring and network monitoring) and they specify that maximum overhead. Based on this information, the VMTI agent 112 uses mathematical algorithms to find the set of monitoring which achieves the user's goals (as closely as possible) while still staying below the desired overhead. The overhead of this decision is monitored and the monitoring rules are modified at runtime to ensure compliance. For example, if the user specifies a goal that no transaction should take longer than X seconds but that the overhead of monitoring should be less than 1%, the VMTI agent 112 may decide to do the minimal amount of work to monitor transactions, which would mean that the log of a long transaction may not say what part of the transaction took the longest, but the overhead goal would still be achieved and the user can change the goals, if necessary, to further diagnose the issue.

Figure 5:
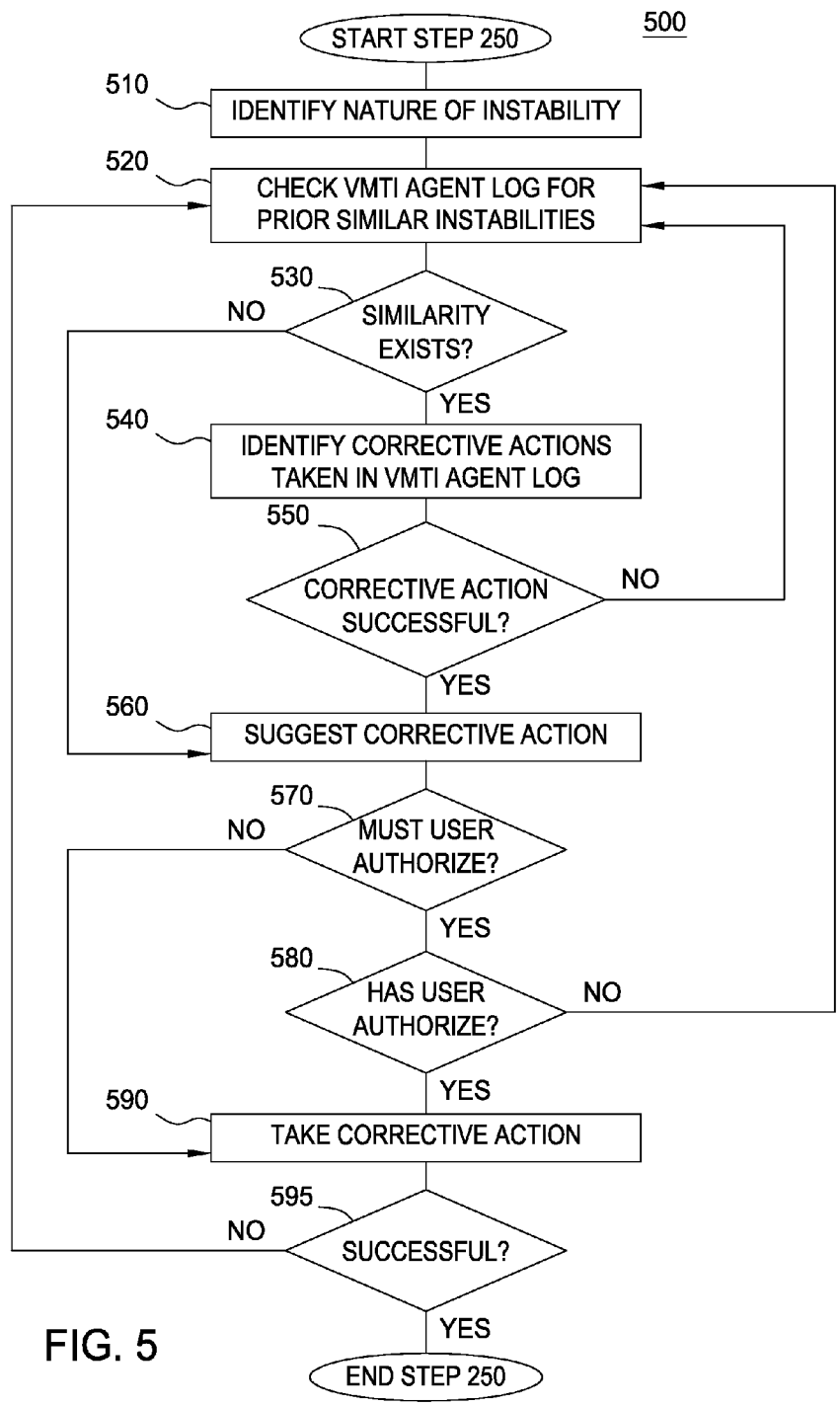
FIG. 5 is a flowchart illustrating a method for repairing virtual machine and operating system health status metrics, according to one embodiment described herein.

FIG. 5 is a flowchart corresponding to step 250 for repairing instabilities. The method begins at step 510, where the nature of the instability is determined based on collected health status metrics. Examples of the nature of the instability include, but are not limited to, CPU utilization, memory utilization, VM stack errors, and VM thread errors. The method then proceeds to step 520, where the VMTI agent 112 checks VMTI agent log 116 for patterns of similar instabilities. The method proceeds to step 530, where the VMTI agent 112 determines whether a similar instability exists. If no similarity exists, the method proceeds to step 560. If a similarity exists, the method proceeds to step 540, where the VMTI agent 112 identifies prior corrective actions taken in the VMTI agent log 116. Then, at step 550, the VMTI agent 112 determines whether the prior corrective actions identified at step 540 were successful in repairing the system instability. If the corrective action was successful, the method proceeds to step 560. If the corrective action was not successful, the method returns to step 520 to determine if different corrective actions were taken, via the VMTI agent log 116.

At step 560, the VMTI agent 112 suggests an action as the corrective action. In one embodiment, the corrective action is the one identified at step 550. In another embodiment, the VMTI agent 112 suggests corrective action based on default corrective actions correlated to the nature of the instability identified at step 510. Exemplary corrective actions include, but are not limited to, interrupting threads, increasing connection pool sizes, and forcing garbage collection. At step 570, the VMTI agent 112 determines whether a user must authorize the actions. If user authorization is not required, the method proceeds to step 595. If user authorization is required, the method proceeds to step 580 where the user is presented with the corrective action for authorization. If the user authorizes the corrective action, the method proceeds to step 590. If the user does not authorize the corrective action, the method returns to step 520. At step 590, the VMTI agent 112 takes the corrective action in an attempt to repair the system.

At step 595, the VMTI agent 112 determines whether the corrective action taken was successful. In one embodiment, the VMTI agent 112 determines that the corrective action taken was successful by continuing to monitor health status metrics and analyze the resultant data. In another embodiment, a user may provide input as to whether the corrective actions taken were successful. If the corrective actions were not successful, the method may return to step 520. In another embodiment, method 500 ends and the system continues monitoring health status metrics.

Figure 6:
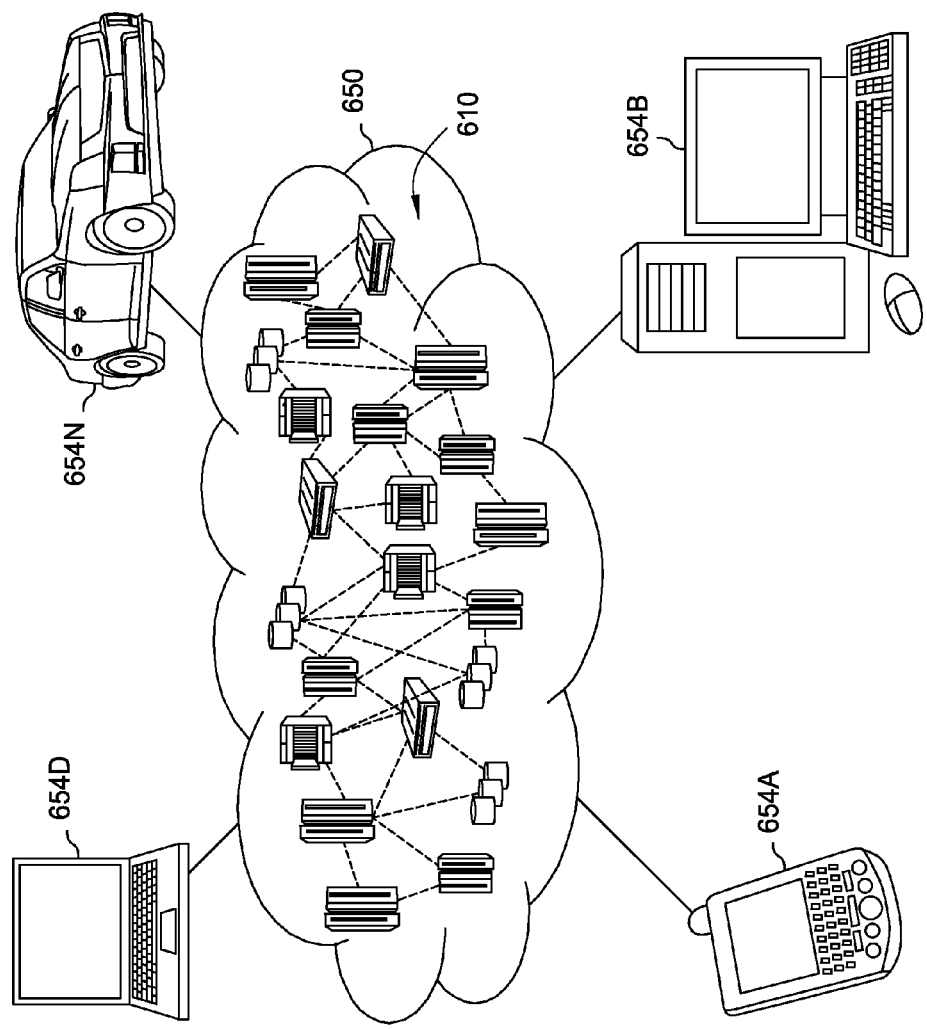
FIG. 6 depicts a cloud computing environment according to one embodiment described herein.

Referring now to FIG. 6, illustrative cloud computing environment 650 is depicted. As shown, cloud computing environment 650 comprises one or more cloud computing nodes 610 with which local computing devices used by cloud consumers, such as, for example, personal digital assistant (PDA) or cellular telephone 654A, desktop computer 654B, laptop computer 654D, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
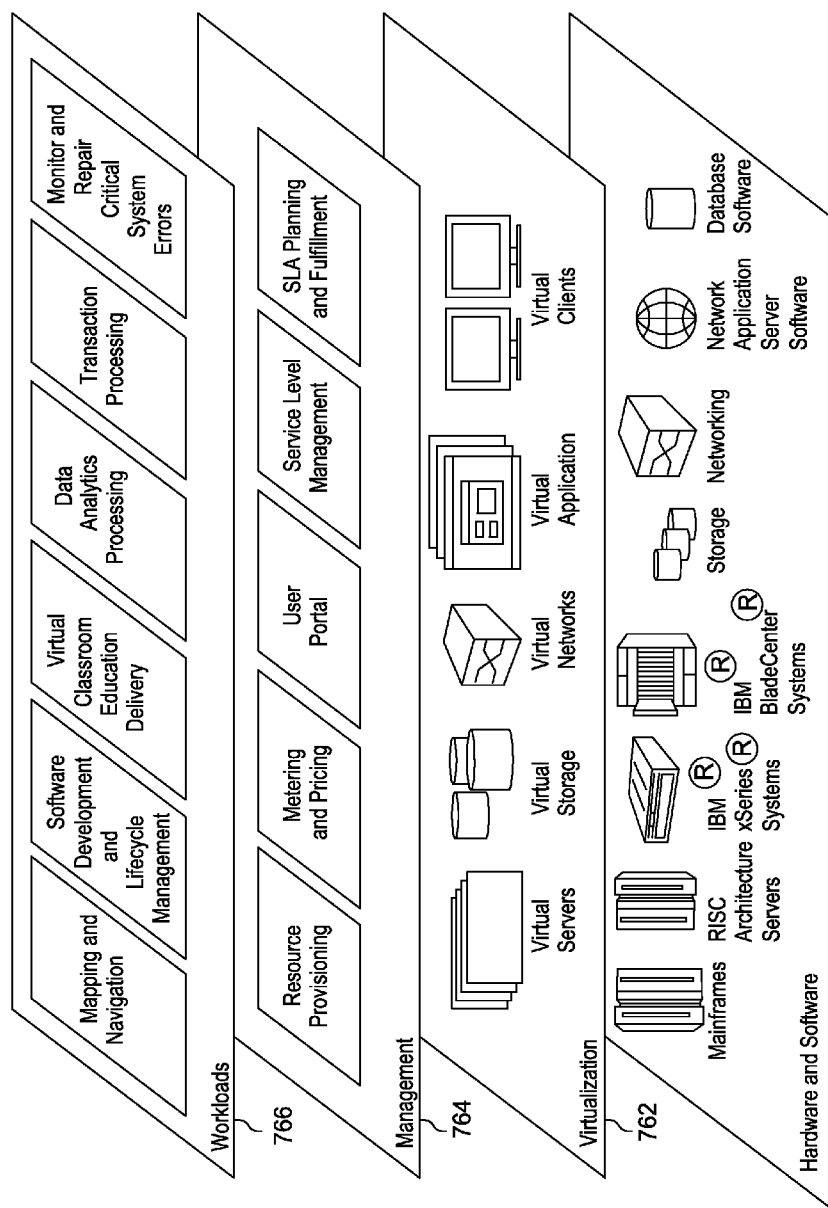
FIG. 7 depicts abstraction model layers according to one embodiment described herein.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 762 provides an abstraction layer from which the following examples of virtual entities may be provided: virtual servers; virtual storage; virtual networks, including virtual private networks; virtual applications and operating systems; and virtual clients.

In one example, management layer 764 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 766 provides examples of functionality for which the cloud computing environment may be utilized. Examples of workloads and functions which may be provided from this layer include: mapping and navigation; software development and lifecycle management; virtual classroom education delivery; data analytics processing; transaction processing; and monitoring and repair of critical system errors.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
monitoring a set of health status metrics of a system at a first level;
analyzing data of the monitored health status metrics to determine that an instability has occurred when the data exceeds defined bounds for the computing system health status metrics;
responding to the instability by monitoring additional health status metrics, whereby a level of monitoring of the system is increased from the first level to a second level, greater than the first level;
repairing the system by taking corrective action based on the instability; and
refraining from monitoring at least one of the set of monitored health status metrics to reduce the level of monitoring to a third level once the instability has been resolved, wherein the third level is less than the second level.

2. The computer-implemented method of claim 1, wherein a user defines the sets of health status metrics to be monitored and the bounds used to determine that an instability has occurred.

3. The computer-implemented method of claim 1, wherein the health status metrics monitored at the first level of monitoring comprise health status metrics of a central processing unit (CPU), a system memory, a system network activity, and a system input/output interface.

4. The computer-implemented method of claim 1, wherein monitoring further comprises:
monitoring no health status metrics during a period of system stability.

5. The computer-implemented method of claim 1, further comprising writing to a system log the additional health status metrics monitored, the instability, the corrective action taken, and an associated effect on system stability for future use, wherein the system log is referenced to identify the health status metrics monitored and corrective actions taken to repair similar instabilities such that effective actions are repeated, and ineffective actions are not repeated.

6. The computer-implemented method of claim 1, further comprising:
prior to repairing the system, receiving user authorization to take the corrective action.

7. The computer-implemented method of claim 1, wherein the computing system is one of: (i) a virtual machine, or (ii) an operating system.

8. The computer-implemented method of claim 7, wherein the computing system is a virtual machine, wherein analyzing data of the monitored health status metrics to determine that the instability has occurred further comprises:
upon determining that a resource has been exhausted:
supporting an early return from a method during execution of the method; and
notifying the virtual machine that the resource has been exhausted.

* * * * *